United States Patent [19]

Fracassi et al.

[11] 4,304,962

[45] Dec. 8, 1981

[54] DATA SCRAMBLER

[75] Inventors: Renato D. Fracassi, Middletown; Tarmo Tammaru, Red Bank, both of N.J.

[73] Assignee: Bell Telephone Laboratories, Incorporated, Murray Hill, N.J.

[21] Appl. No.: 482,498

[22] Filed: Aug. 25, 1965

[51] Int. Cl.³ .............................................. H04L 9/00
[52] U.S. Cl. ............................. 178/22.12; 178/22.14; 178/22.19
[58] Field of Search ..................... 178/22, 22.12, 22.19, 178/22.14; 325/324

[56] References Cited

U.S. PATENT DOCUMENTS 3,162,837 12/1964 Meggitt .
3,421,146 1/1969 Zegers ............................ 178/69 R
4,187,392 2/1980 Safford ................................ 178/22

OTHER PUBLICATIONS

Golomb et al., "On the Factorization of Trinomials Over GF(2)", Memorandum No. 20-189, Jet Propulsion Lab., Jul. 1959, Pasadena.
Peterson, *Error Correcting Codes*, 1961, MIT Press, Chapters 7, 8 and 12.
Golomb et al., *Digital Communications with Space Applications*, 1964, Prentice-Hall, Ch. 1 & 2 & Appendix 3.
Huffman, "The Synthesis of Linear Sequential Coding Networks", *Linear Sequential Switching Circuits*, Selected Technical Papers, Holden–Day, 1965, pp. 1–19.

*Primary Examiner*—Howard A. Birmiel
*Attorney, Agent, or Firm*—Joseph P. Kearns, Jr.; Michael A. Morra

[57] ABSTRACT

Binary digital data signal patterns containing either no transitions, periodically recurring transitions or both are randomized by constructing a key signal from a summation of selected stored digits of the data pattern and combining such key signal with the data signal to form a scrambled line signal for transmission. The line signal so constructed is free of signal energy concentrated at particular frequencies and provides signal transitions adequate in number to assure reliable recovery of synchronization information. Descrambling of the received line signal is accomplished by precisely the inverse of the scrambling operation. The system is self-synchronizing because the key signals constructed by each of the scrambler and descrambler are derived from the same line signal.

12 Claims, 3 Drawing Figures

DATA SCRAMBLER

This invention relates to the randomization of repetitive and continuous digital data signal patterns in electrical communication systems.

Alternating mark and space dotting signal patterns in wide-band, high-speed digital data systems tend to produce single tones which concentrate signal energy in particular narrow regions of the frequency spectrum of transmission channels. Such concentration of energy can lead to serious crosstalk as well as interference problems in multiplex systems due to overloading effects which produce unwanted modulation products.

It is an object of this invention to break up such dotting signal patterns at a transmitter into quasi-random patterns which spread the signal energy over a wider portion of the channel spectrum.

It is another object of this invention to reconstruct at a receiver the repetitive signal pattern from the quasi-random pattern generated at the transmitter.

It is a further object of this invention to provide a combination of a scrambler for a repetitive signal pattern at the transmitting end of a transmission channel with a descrambler at the receiving end without requiring a prearranged keying or framing signal.

Continuous signal patterns, either all marking or all spacing, often occur in message data signal systems, especially during idle conditions. Either of these signaling patterns, being without transitions, represent the absence of signal energy and consequently provide no clock synchronizing information to the receiving station. Therefore, whenever a message sequence becomes available, a starting sequence must precede it to derive a receiver clock signal for synchronous regeneration of the message. Just as it is undesirable to have a concentration of signal energy at certain discrete frequencies caused by alternating signal patterns in a message, it is equally undesirable to have no signal energy on the transmission channel during idle conditions. The presence of some signal energy can provide both additional circuit assurance and synchronization information.

It is yet another object of this invention to generate a randomized signal from a transitionless signal sequence.

According to this invention a synchronous digital data signal is delayed by several bit periods, a modulo-two summation of a selected pair of past data bits is made to form a random-interval key signal, and such key signal is combined modulo-two fashion with the present data bit to form a scrambled transmitted signal bit train which is quasi-random in nature even when the data signal itself is cyclically repetitive.

After passing over the transmission channel where, as a quasi-random signal, its energy is well distributed throughout the frequency band of the channel, the incoming signal train is unscrambled by an operation inverse to that at the transmitter. The incoming scrambled signal is delayed the same amount as the message signal at the transmitter, a modulo-two summation of the corresponding selected pair of bits is made to recover the key signal, and finally the key signal is effectively subtracted from the scrambled incoming signal train to restore the original message signal sequence.

It has been known in the past to combine an arbitrary, but prearranged, key signal to scramble a message signal for secrecy purposes. The unscrambling, however, required foreknowledge at the receiver of the arbitrary key signal. Furthermore, the transmitter and receiver key signals had to be held in synchronism at all times; for if the receiver key did not track the transmitter key the incoming message was rescrambled rather than decoded. The key constructed according to this invention is self-synchronous and will never lose synchronism for longer than the delay period involved in the storage media used at transmitter and receiver. Self-synchronism results because the signal inputs to transmitting and receiving delay media are identical.

In another aspect the scrambler-descrambler of this invention can be adapted to randomize a continuous marking or spacing signal such as can be present on the transmission line during idle periods between messages. No signal transitions normally appear during a continuous idle period and synchronism between transmitter and receiver is lost. The transmission of sporadic messages is thereby precluded unless starting sequences precede each message sequence. In accordance with the principles of this invention, the scrambler produces a quasi-random signal on the line when the message input is continuously idle or "all-zero", or alternatively "all-one". An all-zero message input can also result in a continuous zero output when the starting state of the scrambler delay medium is all zero. A digit injector can be added to the scrambler and descrambler responsive to the presence of such idle signals to initiate the quasi-random code. The quasi-random code is thereafter self-perpetuating and provides periodic signal transitions during idle time. The receiver is thereby maintained in readiness for the receipt of message sequences. The digit injection is accomplished by monitoring the digits stored in the delay medium at both transmitter and receiver and adding a "one" digit to the key whenever an all-space signal appears. In the alternative the contents of the delay medium can be monitored for the presence of an all-mark signal.

A feature of this invention is that the delay means at transmitter and receiver can advantageously comprise digital shift registers. Advance pulses for the shift registers are readily provided from the data clock signals. Thus, a delay is maintained which is commensurate with the data bit period.

An advantage of this invention is the ease with which it may be modified to produce a random pattern from either an alternating input or a continuous input.

A complete understanding of this invention may be gained from a perusal of the following detailed description and the drawing in which.

Figure 1:
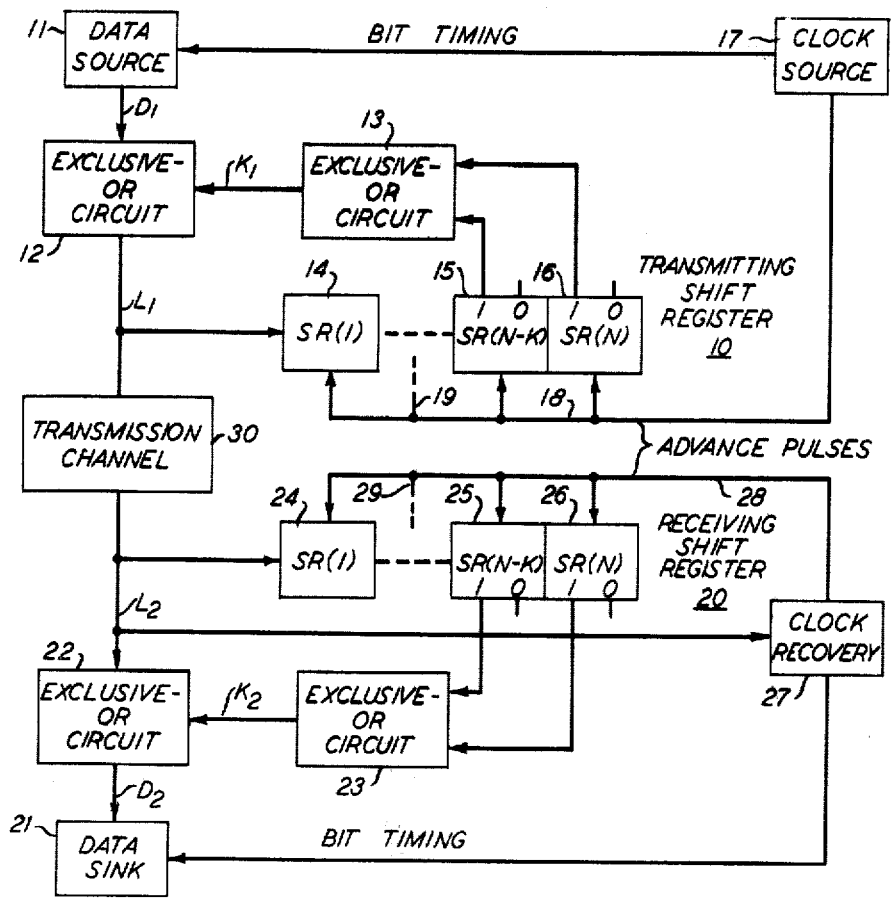
FIG. 1 is a block diagram of a digital data transmission system improved according to this invention to include scrambling and descrambling apparatus to randomize an alternating signal pattern.

FIG. 1 depicts a generalized baseband digital data transmission system in which binary digital data generated in data source 11 and synchronized by clock source 17 is transmitted through transmission channel 30 for delivery to data sink or receiver 21. Bit timing at the receiver is maintained by clock recovery circuit 27 by monitoring the transitions in the signal train in any conventional manner.

Transmission channel 30 generally includes modulation and demodulation equipment whereby the baseband data signals are modulated onto a carrier wave. The frequency spectrum resulting from this modulation will not be fully occupied because the modulation is digital rather than analog. Discrete spectral lines result at sum and difference frequencies related to the carrier rate and the data rate. A random data signal sequence will distribute these spectral lines over the frequency bandwidth available. A repetitive pattern, such as the so-called dotting or alternating mark and space pattern, will produce two pronounced spectral lines at the carrier frequency plus and minus the dotting frequency. These spectral lines represent energy. With the total available energy concentrated at a small number of discrete frequencies overloading of the channel and crosstalk into adjacent channels of a frequency multiplex system result. In a wideband system this condition imposes a limitation on the transmission level of each channel below that permissible for analog signals. Such a level reduction has the further undesirable effect of decreasing the signal-to-noise ratio.

According to this invention, digital signal patterns, including both alternating and continuous sequences, are broken down into quasi-random patterns in a novel way to keep the energy distribution in the channel more nearly uniform. For the purposes of this specification a repetitive signal pattern is one which has a cyclically repeated signal combination. It will be used in the generic sense to include a continuous signal pattern free of transitions and an alternating signal pattern with cyclically occurring transitions.

The breaking up or scrambling of the data pattern is accomplished by inserting a half-adder or EXCLUSIVE-OR circuit 12 between data source 11 and transmission channel 30. EXCLUSIVE-OR circuit 12 adds a quasi-random key signal to the data train from source 11. The key signal is generated by delaying the output of EXCLUSIVE-OR circuit 12 in transmitting shift register 10 and taking the modulo-two sum of two delayed binary signal elements to form the key signal in EXCLUSIVE-OR circuit 13.

Shift register 10 may comprise, for simplicity of of explanation, three binary stages 14, 15, and 16 as shown in FIG. 1. More stages, as indicated by the broken line between stages 14 and 15, may also be used. All stages are advanced by pulses on lead 18 from clock source 17 in synchronous with the generation of data in source 11. Stub lead 19 indicates a connection from advance-pulse lead 18 to additional optional shift register stages. More stages produce a key with longer randomized word lengths and consequent better energy-spreading capability.

The reconstitution or descrambling of the quasi-random encoded line signal is accomplished by apparatus which is the inverse of the scrambler. Elements of the received signal are stored in receiving shift register 20 having at least three stages 24, 25, and 26. Transmitting and receiving shift registers must each have the same number of stages in any event. The line signal may feed a clock recovery circuit 27 as well recover a bit timing wave from transitions therein in a conventional manner. Pulses from clock recovery circuit 27 serve as advance pulses for receiving shift register 20 by way of lead 28. Branch lead 29 supplies such advance pulses for additional shift register stages indicated by the broken line between stages 24 and 25.

The key signal is reconstructed at the receiver by taking the modulo-two sum of the digits in stages 25 and 26 of shift register 20 in EXCLUSIVE-OR circuit 23. The key signal is combined with the line signal modulo-two fashion in EXCLUSIVE-OR circuit 22 to restore the original data signal. The decoded data signal is delivered to data sink 21 and detected with the aid of a bit timing wave from clock recovery circuit 27.

EXCLUSIVE-OR circuits are well known in the art. They are also sometimes referred to as half-adders and AND-NOT circuits. Examples of two principal types are shown in FIG. 13-25 of Millman and Taub's *Pulse and Digital Circuits* on page 411 (McGraw-Hill Book Company, Inc., New York 1956). An EXCLUSIVE-OR circuit produces an output from two binary input signals if and only if the two input signals are complementary. A modulo-two summation is the normal summation with carry discarded and merely indicates oddness or evenness. Modulo-two subtraction produces the same effect.

The operation of the scrambler-descrambler of this invention may be most expeditiously explained by the use of a practical example. Assume that the signal $D_1$ from the data source is a dotting sequence 1010, et cetera, commencing with the marking bit "1" and that a three-stage shift register is being used with initial contents 000. Combining the "0" bits in shift register stages 15 and 16 in EXCLUSIVE-OR circuit 13 yields a first bit for key signal $K_1$ of "0". Combining key $K_1$ with the first "1" of data sequence $D_1$ in EXCLUSIVE-OR circuit 12 produces the first bit of the line signal $L_1$ as a "1" bit. This "1" bit is also stored in shift register stage 14 as the advance pulse moves the former contents of stages 14 and 15 into stages 15 and 16. The contents of the rightmost stages are still both "0" and therefore the next key bit is also "0". Now, however, the data bit is "0" and the line bit is made "0". Thus far the line bits are exactly the same as the data bits.

On the next advance pulse the rightmost shift-register stages store complementary bits and the key bit becomes "1". The next line bit, a "1", is converted into a "0" bit. The next key bit, likewise a "1", is added to the succeeding "0" data bit to become a "1" line bit. Randomization is beginning to take place. The following table shows in the first six columns the transformation of a dotting data signal into a quasi-random line signal, using a three-stage shift register, according to the above scheme.

TABLE I

| TRANSMITTER S.R. STAGES | | | KEY | DATA | LINE | RECEIVER S.R. STAGES | | | KEY | DATA |
|---|---|---|---|---|---|---|---|---|---|---|
| 14 | 15 | 16 | $K_1$ | $D_1$ | $L_1 = L_2$ | 24 | 25 | 26 | $K_2$ | $D_2$ |
| 0 | 0 | 0 | 0 | 1 | 1 | 0 | 0 | 0 | 0 | 1 |
| 1 | 0 | 0 | 0 | 0 | 0 | 1 | 0 | 0 | 0 | 0 |
| 0 | 1 | 0 | 1 | 1 | 0 | 0 | 1 | 0 | 1 | 1 |
| 0 | 0 | 1 | 1 | 0 | 1 | 0 | 0 | 1 | 1 | 0 |
| 1 | 0 | 0 | 0 | 1 | 1 | 1 | 0 | 0 | 0 | 1 |
| 1 | 1 | 0 | 1 | 0 | 1 | 1 | 1 | 0 | 1 | 0 |
| 1 | 1 | 1 | 0 | 1 | 1 | 1 | 1 | 1 | 0 | 1 |
| 1 | 1 | 1 | 0 | 0 | 0 | 1 | 1 | 1 | 0 | 0 |

TABLE I-continued

| TRANSMITTER S.R. STAGES | | | KEY | DATA | LINE | RECEIVER S.R. STAGES | | | KEY | DATA |
|---|---|---|---|---|---|---|---|---|---|---|
| 14 | 15 | 16 | $K_1$ | $D_1$ | $L_1 = L_2$ | 24 | 25 | 26 | $K_2$ | $D_2$ |
| 0 | 1 | 1 | 0 | 1 | 1 | 0 | 1 | 1 | 0 | 1 |
| 1 | 0 | 1 | 1 | 0 | 1 | 1 | 0 | 1 | 1 | 0 |
| 1 | 1 | 0 | 1 | 1 | 0 | 1 | 1 | 0 | 1 | 1 |
| 0 | 1 | 1 | 0 | 0 | 0 | 0 | 1 | 1 | 0 | 0 |
| 0 | 0 | 1 | 1 | 1 | 0 | 0 | 0 | 1 | 1 | 1 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |

The first three columns of Table I represent the contents of transmitting shift register 10 stage by stage. The initial contents are arbitrarily assumed. The fourth column contains the key bits $K_1$ obtained by half-summing the contents of stages 15 and 16. The fifth column is the data signal $D_1$ from source 11, assumed to be alternately marking and spacing ("1" and "0"). The center column is the scrambled line signal injected into transmission channel 30. The line signal $L_1$ is the half-sum of columns four ($K_1$) and five ($D_1$). Each line signal bit is inserted into shift-register stage 14 after the advance pulse as shown in the next lower row. It is seen that the dotting sequence is broken up into a code sequence which repeats on the fifteenth bit instead of every other bit. It can be demonstrated that the word length before repetition occurs varies with the number of shift-register stages used. A seven-stage shift register, for example, produces a quasi-random word length exceeding 127 bits from a dotting input sequence. Other alternating sequences, such as double "1" alternating with double "0", are similarly broken up. A normally random sequence is transformed into another uncorrelated random sequence so that the scrambler is also usable for secrecy purposes.

The operation of the descrambler is the inverse of the operation of the scrambler. Incoming line signal bits $L_2$ are stored seriatim in stages 24, 25 and 26 of receiving shift register 20 and are also applied to EXCLUSIVE-OR circuit 22. The contents of stages 25 and 26 are combined modulo-two fashion in EXCLUSIVE-OR circuit 23 to reform the key signal $K_2$. The line and key bits are finally half-added in EXCLUSIVE-OR circuit 22 to form the original data sequence.

Continuing with the example shown in the table above and assuming that the shift-register stages 24, 25 and 26 are storing "0's" initially, the first key bit in column 10 is "0". The first line bit is "1", as shown in the center column of the table. Combined with the "0" key bit the recovered data sequence $D_2$ begins with "1". The "1" line bit is stored in stage 24 as the advance pulse arrives as shown in the next lower row of column seven. The next key bit of sequence $K_2$ remains a "0" and when half-added to the next line bit in column six becomes a "0" data bit. The key bit in each case is the modulo-two sum of the bits in columns eight and nine. The descrambling can be followed row by row in the table. It is apparent that columns seven through eleven, relating to the descrambling operation, are identical to columns one through five, relating to the scrambling operation.

In the event that the three-stage receiving and transmitting shift registers are not in the same initial state, synchronism would be gained within three data intervals. In general, the number of data intervals required to gain synchronism is the same as the number of stages.

Figure 2:
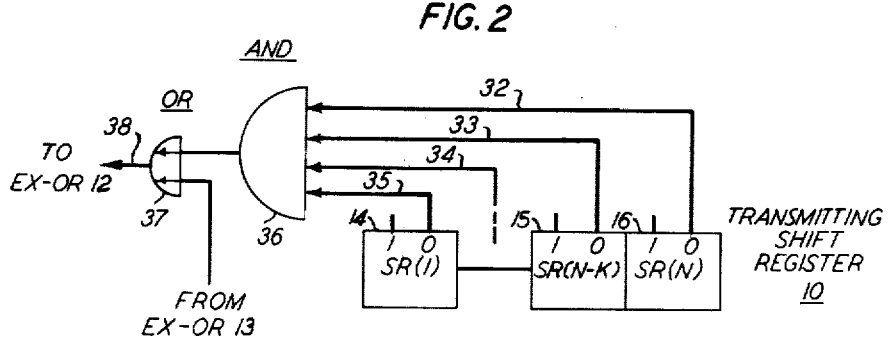
FIG. 2 is a modification of the arrangement of FIG. 1 to permit randomization of a transitionless signal.

With but slight modification the scrambler-descrambler of this invention can be used to randomize an all-zero or transitionless data sequence, such as may constitute an idle line condition. FIG. 2 is a circuit for generating a key bit whenever the data sequence contains at least as many "0's" as there are shift-register stages. In FIG. 2 the complementary "0" outputs of all shift-register stages, such as those designated 14, 15 and 16, are brought by means of leads 32, 33 and 35 to a coincidence or AND-gate 36. Gate 36 therefore has a "1" output whenever all the shift-register stages contain "0's". A buffer or OR-gate 37 is added between AND-gate 36 and the input to EXCLUSIVE-OR gate 12 by way of lead 38 where it is desired to combine the functions of scrambling both continuous and alternating signal patterns. OR-gate 37 accordingly has another input from EXCLUSIVE-OR gate 13 as shown. The circuit of FIG. 2 has been given the designation "one-stuffer".

For descrambling similar AND- and OR-gates are required at the receiver.

Operation of the one-stuffer is illustrated in the following Table II for a three-stage shift register. The explanation is similar to that in connection with Table I.

TABLE II

| TRANSMITTER S.R. STAGES | | | KEY | DATA | LINE | RECEIVER S.R. STAGES | | | KEY | DATA |
|---|---|---|---|---|---|---|---|---|---|---|
| 14 | 15 | 16 | $K_1$ | $D_1$ | $L_1 = L_2$ | 24 | 25 | 26 | $K_2$ | $D_2$ |
| 0 | 0 | 0 | 1* | 0 | 1 | 0 | 0 | 0 | 1* | 0 |
| 1 | 0 | 0 | 0 | 0 | 0 | 1 | 0 | 0 | 0 | 0 |
| 0 | 1 | 0 | 1 | 0 | 1 | 0 | 1 | 0 | 1 | 0 |
| 1 | 0 | 1 | 1 | 0 | 1 | 1 | 0 | 1 | 1 | 0 |
| 1 | 1 | 0 | 1 | 0 | 1 | 1 | 1 | 0 | 1 | 0 |
| 1 | 1 | 1 | 0 | 0 | 0 | 1 | 1 | 1 | 0 | 0 |
| 0 | 1 | 1 | 0 | 0 | 0 | 0 | 1 | 1 | 0 | 0 |
| 0 | 0 | 1 | 1 | 0 | 1 | 0 | 0 | 1 | 1 | 0 |
| 1 | 0 | 0 | 0 | 0 | 0 | 1 | 0 | 0 | 0 | 0 |
| 0 | 1 | 0 | 1 | 0 | 1 | 0 | 1 | 0 | 1 | 0 |
| 1 | 0 | 1 | 1 | 0 | 1 | 1 | 0 | 1 | 1 | 0 |
| 1 | 1 | 0 | 1 | 0 | 1 | 1 | 1 | 0 | 1 | 0 |
| 1 | 1 | 1 | 0 | 0 | 0 | 1 | 1 | 1 | 0 | 0 |

TABLE II-continued

| TRANSMITTER S.R. STAGES | | | KEY | DATA | LINE | RECEIVER S.R. STAGES | | | KEY | DATA |
|---|---|---|---|---|---|---|---|---|---|---|
| 14 | 15 | 16 | $K_1$ | $D_1$ | $L_1 = L_2$ | 24 | 25 | 26 | $K_2$ | $D_2$ |
| 0 | 1 | 1 | 0 | 0 | 0 | 0 | 1 | 1 | 0 | 0 |

A three-stage shift register is seen to transform an all-zero continuous pattern into a quasi-random sequence with a seven-bit word length. A transition is produced at least every third bit. Similarly, if an all-one pattern were used in the idle state, a one-stuffer is provided. Generally, precautions would be taken in a practical system to limit the length of one or the other transitionless patterns.

The self-synchronous nature of the scrambler-descrambler of this invention can be demonstrated by reconstructing the pattern of Table I and introducing an error in the line signal as shown in the following Table III.

seven stages SR-1 through SR-7. The contents of the several stages are shifted one stage to the right with each advance pulse on lead 18 from clock source 17 (FIG. 1). Complementary "1" and "0" outputs are shown for each stage. The coded line signal is applied to stage SR-1 by way of lead 47 as in FIG. 1.

The data train to be scrambled or randomized originates in data source 11. This train is combined with a key signal in EXCLUSIVE-OR circuit 12 as in FIG. 1.

By experimental and computer evaluation it has been determined that the greatest random word length is obtained in a seven-stage shift register when the key bits are generated by half-adding the outputs of nonadjacent

TABLE III

| TRANSMITTER S.R. STAGES | | | KEY $K_1$ | DATA $D_1$ | LINE $L_1 = L_2$ | RECEIVER S.R. STAGES | | | KEY $K_2$ | DATA $D_2$ |
|---|---|---|---|---|---|---|---|---|---|---|
| 0 | 0 | 0 | 0 | 1 | 1 | 0 | 0 | 0 | 0 | 1 |
| 1 | 0 | 0 | 0 | 0 | 0 | 1 | 0 | 0 | 0 | 0 |
| 0 | 1 | 0 | 1 | 1 | 0 | 0 | 1 | 0 | 1 | 1 |
| 0 | 0 | 1 | 1 | 0 | 1 | 0 | 0 | 1 | 1 | 0 |
| 1 | 0 | 0 | 0 | 1 | 0** | 1 | 0 | 0 | 0 | 0* |
| 1 | 1 | 0 | 1 | 0 | 1 | 0 | 1 | 0 | 1 | 0* |
| 1 | 1 | 1 | 0 | 1 | 1 | 1 | 0 | 1 | 1*** | 0* |
| 1 | 1 | 1 | 0 | 0 | 0 | 1 | 1 | 0 | 1*** | 1* |
| 0 | 1 | 1 | 0 | 1 | 1 | 0 | 1 | 1 | 0 | 1 |
| 1 | 0 | 1 | 1 | 0 | 1 | 1 | 0 | 1 | 1 | 0 |

In row five of Table III an error is introduced in the line signal of column six by changing the correct "1" from Table I to "0" (double asterisk). This line signal error is reflected as an error in the received data signal $D_2$ in column eleven, as indicated by the single asterisk. Subsequently this same error is propagated through the receiver shift register as underlined in the next three rows and cause errors in the $K_2$ key bits in rows seven and eight (triple asterisks). Row six yields correct results. However, the corresponding recovered data bits in rows six through eight, also indicated by single asterisks, are of doubtful validity as a signal pattern. The data bits in rows nine and ten are once again correctly received. Had the data sequence $D_1$ been random and an error in the line signal occurred, synchronism of the transmitting and receiving keys would have been restored in a similar fashion within the span of the shift register.

There is a problem situation that can arise when a dotting pattern occurs. This is the problem of hangup. When the shift register stores the dotting sequence 101 et cetera, and the initial bit of the dotting data train is a "1" or when the shift register contains 010 et cetera, and the initial bit of the dotting sequence is a "0", the signal pattern is not randomized. On the occurrence of either of these situations the original dotting pattern is merely reversed. These relatively rare situations can be monitored using conventional logic circuits as appropriate. A "1" or "0" is then stuffed in a manner similar to that effected in the case of the steady idle patterns.

Figure 3:
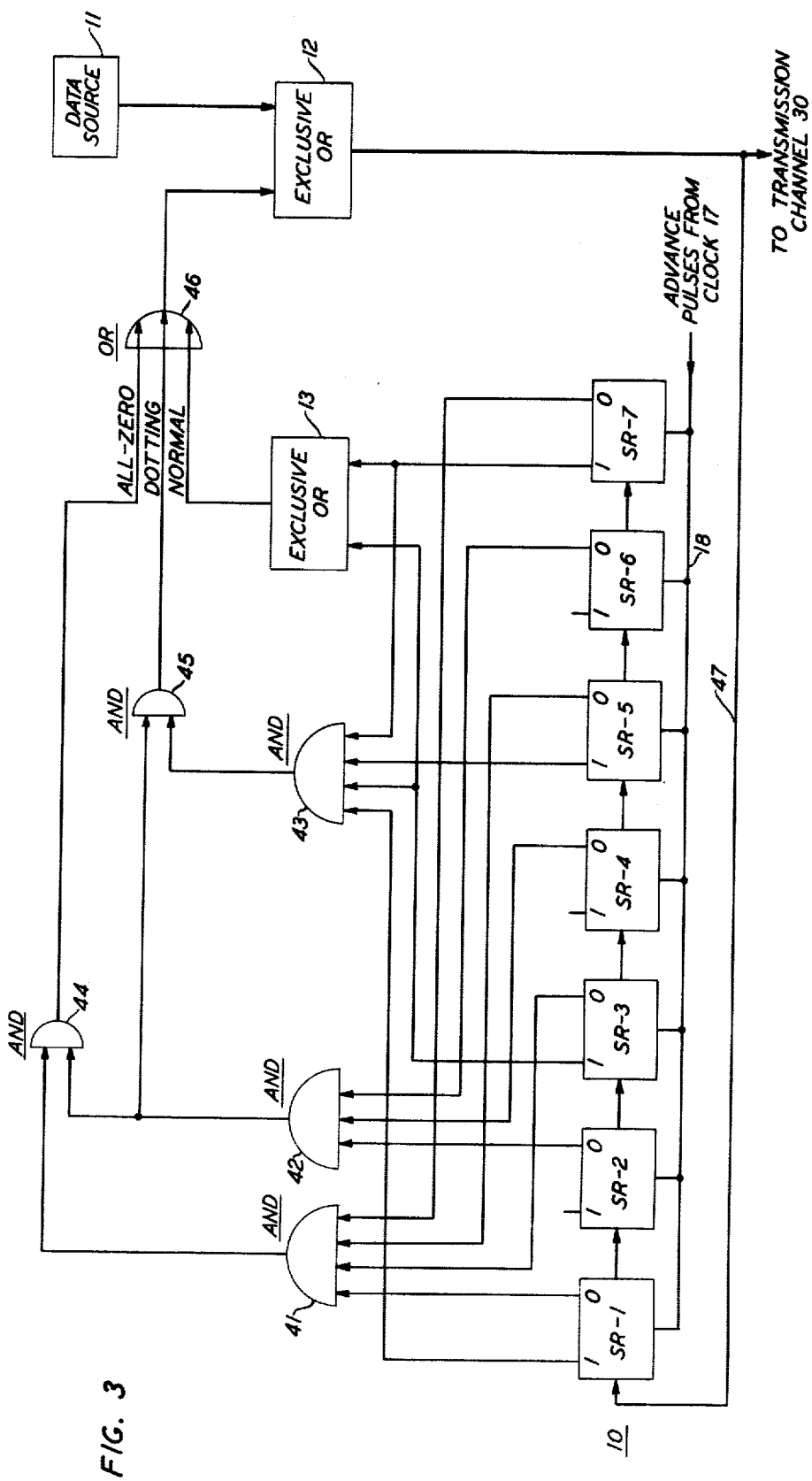
FIG. 3 is a block diagram of signal scrambling apparatus according to this invention incorporating randomization of idle patterns and protection against alternating patterns causing hangup.

FIG. 3 depicts a block diagram of a practical scrambler circuit according to this invention which randomizes both dotting and all-zero signal trains and provides hangup protection against dotting sequences standing in the register continuously. Shift register 10 includes shift register stages. In the three-stage example of FIG. 1 the contents of the last two stages are combined to form the key. This arrangement was found not to be optimum. In the seven-stage example of FIG. 3 the key is developed by combining the "1" outputs of stages SR-3 and SR-7 in EXCLUSIVE-OR circuit 13. This variation is suggested in FIG. 1 by designating the second last stage SR(N-K) rather than SR(N-1), where K is an integer smaller than N, the number of stages.

The output of circuit 13 through conventional buffer OR-gate 46 on the lead marked "NORMAL" provides the key signal when the contents of the shift register are random and the data signal itself is other than all-zero. In the event that the contents of the shift register should be alternately "1" and "0" the key signal developed in circuit 13 will be all "0". This condition is unfavorable and therefore noninverting coincidence or AND-gates 42 and 43 are provided to monitor the shift register contents accordingly. AND-gate 43 monitors the "1" outputs of the odd-numbered stages SR-1, SR-3, SR-5 and SR-7 and generates a "1" output in such a condition. AND-gate 42 similarly monitors the "0" outputs of even-numbered stages SR-2, SR-4 and SR-6, and generates a "1" output in such a condition. The outputs of gates 42 and 43 are combined in further AND-gate 45, which produces a "1" output when both gates 42 and 43 contain a "1" output. This indicates that the shift register contents are alternately "1" and "0". The output of gate 45 on the lead marked "DOTTING" activates EXCLUSIVE-OR gate 12 through buffer gate 46. Effectively it inhibits the normal key bit whenever the shift register contains the dotting pattern and preserves the randomness of the line signal.

A random line signal is generated automatically from an idle all-zero sequence standing in shift register 10 as explained in connection with FIG. 2. AND-gate 42 is already monitoring the "0" output of the even-numbered stages. Further AND-gate 41 is connected to monitor the "0" outputs of the odd-numbered stages as shown. Therefore, combining the outputs of AND-gates 41 and 42 in further AND-gate 44 gives an indication of the existence of the idle all-zero state of the line signal. A "1" output from gate 44 applied over the lead marked "ALL-ZERO" to buffer gate 46 provides an inhibiting control on the key signal and generates a random line signal.

For a scrambler-descrambler system a similar seven-stage shift register with associated logic is required at the receiver as indicated in FIG. 1.

It has been found that a random word length of 102 bits results from a dotting data signal in the seven-stage register generating a key signal from the contents of the third and seventh stages. A 102-bit word results from an all-zero idle signal, as well.

While this invention has been described in terms of specific embodiments, the principles set forth are susceptible to wide application by those skilled in the art. It has application to any binary data system for the purposes of secrecy, circuit assurance or energy dispersion. The breadth of the invention is to be determined by the appended claims and is not intended to be limited by the specific illustrative embodiments.

What is claimed is:

1. Apparatus for scrambling and descrambling a nonrandom alternating binary data sequence during its passage through a transmission channel to spread the signal energy over the frequency bandwidth of said channel comprising
   first means for storing successive data bits arranged in order of occurrence,
   means for half-adding pairs of selected bits from said first storing means to form individual bits of a key signal,
   further means for half-adding bits of said key signal to said data sequence to form a quasi-random line signal for application to said transmission channel and to said first storing means,
   second means for storing successive bits of the line signal from said transmission channel arranged in order of occurrence,
   means for half-adding pairs of selected bits from said second storing means to reconstitute the individual bits of said key signal, and
   final means for half-adding bits of said key signal to said line signal to recover said data sequence.

2. Apparatus for scrambling and descrambling a continuous data sequence with all elements of the same sense during its passage through a transmission channel to generate regular clocking transitions comprising
   first means for storing successive data bits arranged in order of occurrence,
   means for half-adding pairs of selected bits from said first storing means to form individual bits of a key signal,
   means responsive to a succession of data bits all of one particular sense stored in said first means for generating a "one" digit in said key signal,
   further means for half-adding bits of said key signal to said data sequence to form a quasi-random line signal for application to said transmission channel and to said first storing means,
   second means for storing successive bits of the line signal from said transmission channel arranged in order of occurrence,
   means for half-adding pairs of selected bits from said second storing means to reconstitute the individual bits of said key signal,
   further means responsive to a succession of data bits all of said one particular sense stored in said second means for generating a "one" digit in said key signal, and
   final means for half-adding bits of said key signal to said line signal to restore said continuous data sequence.

3. Means for randomizing a binary data signal pattern comprising
   a multi-stage shift register,
   a first EXCLUSIVE-OR circuit combining the contents of a pair of stages of said shift register to form a key signal bit,
   a second EXCLUSIVE-OR circuit combining each said key signal bit with a data signal bit to form a randomized line signal, and
   means for applying said line signal to the first stage of said shift register.

4. Means for recovering a binary data signal pattern from a randomized line signal containing a key signal comprising
   a multi-stage shift register,
   means for applying said line signal to the first stage of said shift register,
   a first EXCLUSIVE-OR circuit combining the contents of a pair of stages of said shift register to reconstruct said key signal bit by bit, and
   a second EXCLUSIVE-OR circuit combining said line signal and said key signal to form said data signal pattern.

5. In combination with a binary data signaling system including a data source, a transmission channel and a data sink:
   means at the near end of said transmission channel for breaking up a nonrandom all-space or alternating mark and space signal pattern into a random bit sequence comprising
   a transmitting shift register having a fixed number of stages,
   a first half-adder combining the contents of two of the stages of said transmitting shift register modulo-two fashion thereby generating a random key signal,
   a second half-adder combining the key signal from said first half-adder modulo-two fashion with the nonrandom data signal from said source to form a randomized line signal,
   a first coincidence circuit monitoring all stages of said transmitting shift register and producing an output if and only if all stages are storing spacing bits,
   means for applying the output of said first coincidence circuit to said second half-adder as an additional key signal bit,
   a clock circuit for synchronizing said data source with advance signals for said transmitting shift register,
   means introducing said randomized line signal into said transmission channel; and
   means at the far end of said transmission channel for reconstructing the original nonrandom signal pattern from said randomized line signal comprising a receiving shift register having the same fixed number of stages as said transmitting shift register, a third half-adder combining the contents of two of the stages of said receiving shift register modulo-two fashion thereby regenerating said random key signal, a fourth half-adder combining said line signal with the key signal from said third half-adder modulo-two fashion thereby reconstructing the nonrandom signal pattern for delivery to said data sink, a second coincidence circuit monitoring all stages of said receiving shift register and producing an output if and only if all stages are storing spacing bits, means for applying the output of said second coincidence circuit to said fourth half-adder as an additional key signal bit, and a clock recovery circuit for synchronizing said data sink with advance signals for said receiving shift register.

6. In combination with a binary data signaling system including a data source, a transmission channel and a data sink:

means at the near end of said transmission channel for breaking up an alternating mark and space signal pattern into a random bit sequence comprising a transmitting shift register having a fixed number of stages, a first half-adder combining the contents of at least two stages of said transmitting shift register modulo-two fashion thereby generating a random key signal, a second half-adder combining the key signal from said first half-adder modulo-two fashion with the data signal from said source to form a randomized line signal, a clock circuit for synchronizing said data source with advance signals for said transmitting shift register, and means introducing said randomized line signal into said transmission channel; and means at the far end of said transmission channel for reconstructing the original signal pattern from said randomized line signal comprising a receiving shift register having the same fixed number of stages as said transmitting shift register, a third half-adder combining the contents of at least two stages of said receiving shift register modulo-two fashion thereby regenerating said random key signal, a fourth half-adder combining said line signal with the key signal from said third half-adder modulo-two fashion thereby reconstructing the nonrandom signal pattern for delivery to said data sink, and a clock recovery circuit for synchronizing said data sink with advance signals for said receiving shift register.

7. The combination of claim 6 in which first coincidence circuits monitor the outputs of the odd-numbered stages of said transmitting and receiving shift register to indicate that all such stages store signals of the same sense, second coincidence circuits monitor the outputs of even-numbered stages of said transmitting and receiving shift registers and indicate the simultaneous storage of signals of the sense opposite to that in said odd-numbered stages, and third coincidence circuits combining the outputs of said first and second coincidence circuits to inhibit the outputs of said second and fourth half-adders and thereby insure a random line signal when the shift registers store an alternating signal sequence.

8. Self-synchronous apparatus adapted to transform an input binary signal into an output binary signal, one of said binary signals being randomized data, comprising:

means for inputting the randomized data to a key register having a plurality of locations for storing binary digits;

means for constructing a binary key signal by modulo-two combination of digits appearing at the outputs of two selected locations of said key register; and means for combining the key signal with the input binary signal to form the output binary signal.

9. Apparatus as set forth in claim 8 in which the key register is a shift register having at least three stages and the selected locations are the last two stages.

10. Apparatus as set forth in claim 8 in which the means for constructing a key signal comprises an EXCLUSIVE-OR circuit.

11. Apparatus as set forth in claim 8 in which said combining means comprises an EXCLUSIVE-OR circuit.

12. Self-synchronous apparatus as set forth in claim 8 and means responsive to all digits stored in the key register locations being of the same sense for generating a "one" digit in the key signal to randomize a steady signal pattern with all elements of the same sense.

* * * * *